(12) United States Patent
Humm et al.

(10) Patent No.: US 8,967,188 B2
(45) Date of Patent: Mar. 3, 2015

(54) SHEAR VALVE

(76) Inventors: Gary Humm, Sittingbourne (GB); Scott Humm, Sittingbourne (GB)

( * ) Notice: Subject to any disclaimer, the term of this patent is extended or adjusted under 35 U.S.C. 154(b) by 49 days.

(21) Appl. No.: 13/814,935

(22) PCT Filed: Aug. 18, 2011

(86) PCT No.: PCT/GB2011/051559
§ 371 (c)(1),
(2), (4) Date: Feb. 7, 2013

(87) PCT Pub. No.: WO2012/022978
PCT Pub. Date: Feb. 23, 2012

(65) Prior Publication Data
US 2013/0133756 A1 May 30, 2013

(30) Foreign Application Priority Data

Aug. 18, 2010 (GB) .................................. 1013833.7

(51) Int. Cl.
*F16L 55/18* (2006.01)
*B26D 3/00* (2006.01)
*B26D 1/08* (2006.01)
*F16K 17/36* (2006.01)
*F16K 3/02* (2006.01)
*F16L 55/105* (2006.01)

(52) U.S. Cl.
CPC ............... *F16K 17/36* (2013.01); *F16K 3/0281* (2013.01); *F16L 55/105* (2013.01)

USPC ............................................... 137/318; 83/54

(58) Field of Classification Search
CPC .................................. F16L 41/04; F16K 41/06
USPC ....................... 137/317, 318, 320, 322; 83/54
See application file for complete search history.

(56) References Cited

U.S. PATENT DOCUMENTS

| 3,687,166 | A |   | 8/1972  | Herrin |              |
|-----------|---|---|---------|--------|--------------|
| 4,537,250 | A | * | 8/1985  | Troxell, Jr. | ........................ 166/55 |
| 5,076,318 | A | * | 12/1991 | Fedora | ........................... 137/318 |
| 5,269,340 | A | * | 12/1993 | Drzewiecki | .................... 137/318 |
| 5,887,346 | A | * | 3/1999  | McCasland | ..................... 30/90.1 |

FOREIGN PATENT DOCUMENTS

| WO | 91/10091   | 7/1991 |
| WO | 2010/013042 | 2/2010 |

OTHER PUBLICATIONS

International Search Report of PCT Patent Application No. PCT/GB2011/051559.

* cited by examiner

*Primary Examiner* — John K Fristoe, Jr.
*Assistant Examiner* — Kevin Barss

(57) ABSTRACT

A shear valve (10) comprises a casing having a first part (12) for positioning on one side of a pipe and a second part (14) engageable with the first part (12) for positioning on the other side of the pipe. A blade (26) is disposed substantially within the first part and is actuable across the pipe towards the second part for cutting the pipe. The blade has a support region for supporting the periphery of the pipe as the pipe is being cut.

20 Claims, 4 Drawing Sheets

SHEAR VALVE

The present invention relates to a shear valve.

BACKGROUND TO THE INVENTION

In domestic and commercial plumbing, it is sometimes necessary to install a shut-off valve to interrupt a flow of fluid in a pipe. It can also be advantageous to be able to install the valve without turning off the fluid supply for installation of the valve. A shear valve may be used for this purpose. Typically a shear valve has a cutting blade which is actuated across a pipe for shearing the pipe within the valve.

Shear valves sometimes fail to cut a pipe cleanly, because the frictional forces between the pipe and the blade are large. Furthermore, pipes sometimes collapse as they are being cut, because the blade acts downwardly from one side of the pipe. Thinning the cutting blade reduces the frictional forces, but the blade needs to be a certain size and thickness to have sufficient strength to make the cut. Once cut, the shear valve may not always provide a perfect seal for shutting off a fluid supply.

A further problem of a shear valve, is that once cut, the live pipe end can come out of the shear valve, due in part, to restricted flow causing back pressure on the pipe. A yet further problem of a typical shear valve, is that a threaded actuator for causing actuation of the cutting blade extends from the outer casing of the valve and is sealed on the thread. This can lead to leaks from the valve, because threads can be difficult to seal.

It is an object of the invention to provide a shear valve which reduces or obviates the aforementioned problems.

SUMMARY OF THE INVENTION

According to the present invention there is provided a shear valve comprising a casing having a first part for positioning on one side of a pipe and a second part engageable with the first part for positioning on the other side of the pipe, and a blade for shearing the pipe disposed substantially within the first part and actuable across the pipe towards the second part for cutting the pipe, the blade having a cutting region and a support region for supporting the periphery of the pipe as the pipe is being cut.

Advantageously the support region of the blade substantially prevents a pipe from collapsing as it is being cut, resulting in a clean cut. The diameter of the pipe is not restricted as it is cut and hence the flow rate through the pipe is not adversely affected.

The blade may be substantially flat on one side for sealing against an O-ring, which may be split between the first and second parts. The ability to seal against the blade, allows the blade to serve as a gate valve, which may be opened and closed as desired.

In order to ensure that the blade does not veer off or angle away from a perpendicular cutting path, a pair of parallel protrusions are provided on the substantially flat side of the blade, on either edge thereof and disposed parallel with the central cutting axis of the blade. The protrusions not only serve to prevent undesirable angling or tilt of the blade during cutting, but they also ensure that the pinch or compression on the adjacent O-ring is even and not too tight or too slack. The blade is also prevented from damaging the O-ring seal in the cutting movement, by ensuring that the point of the blade does not cut the O-ring seal.

The blade may have a pair of support surfaces extending substantially perpendicularly from the other side of the blade, in use, the support surfaces passing on opposite sides of a pipe being cut by the shear valve.

The support surfaces advantageously support both sides of the pipe as it is being cut.

The support surfaces may be part of a substantially C-shaped flange, provided around the sides and non-cutting end of the blade.

A drive member for actuating the blade in both directions may be mounted for rotation in the end of the first part.

The drive member may be threaded at one end positioned internally of the first part for engagement with the blade. The other end of the drive member may pass through an aperture in the first part for engagement with a handle.

At least part of the drive member may be received between the support surfaces of the blade. This is advantageous because the drive member can be fixed longitudinally relative to the end of the first part, irrespective of the position of the blade.

The blade may be guided on guide surfaces within the first part as it is actuated. In particular, the protrusions on the flat surface of the blade are guided. This prevents twisting of the blade as it is actuated and holds the blade firmly in a fixed plane for sealing against the O-ring as it is moved between the open and closed positions.

The first and second parts, when assembled, may have a bore extending directly there-through for receiving a straight length of pipe. This enables the shear valve to be easily assembled and installed over a length of straight pipe.

The bore may open into a central chamber of the shear valve and a counter-bore may be provided at the junction of the bore with the central chamber. The counter-bore may face a substantially flat surface of the blade.

The counter-bore is advantageous, because as the pipe is cut, the cut end of the pipe curls downwardly at its lower edge due to the downward action of the blade. This curling is accommodated in the counter-bore and prevents the pipe from being pulled out of the valve. It also facilitates a clean cut, because the frictional force between the blade and pipe is relieved by the pipe being able to expand into the counter-bore.

A second and a third counter-bore may be provided in the bore proximate the respective ends of the bore, for receiving seals for sealing the bore to a pipe passing through the bore on either side of the shear valve. The seals are particularly effective, because the pipe tends to swell as it is cut, thus expanding the pipe into the seals and improving the seal. Furthermore, the ability of the pipe the swell into the second and third counter-bores as it is being cut, relieves the frictional forces acting on the blade and improves the cut. Grooves may be provided in the faces of the first and second parts, between the counter bores which receive the seals. The grooves correspond and face each other when the valve is assembled and silicone-based sealant may be applied to the grooves to seal the valve.

The first part may be connected to the second part by screws. Preferably the screws are threaded into the threaded bores in the second part and extend through apertures in the first part.

The second and third counter-bores may be positioned substantially at or between the positions of the screws. This ensures that the pipe is securely gripped at the position of the seals. The swelling of the pipe into the second and third counter-bores also increases the grip of the valve on the pipe.

An aperture may be provided in the casing for splitting of the flow through the valve. The aperture may be provided in the first part. An external boss may be provided around the aperture, for connection with a pipe or hose.

Advantageously the flow through the valve can be split between the outlet to the pipe and the aperture in the first part. Around 40 to 50% of the flow may be directed through the aperture in the first part of the valve.

BRIEF DESCRIPTION OF THE DRAWINGS

For a better understanding of the present invention, and to show more clearly how it may be carried into effect, reference will now be made, by way of example, to the accompanying drawings, in which.

DESCRIPTION OF PREFERRED EMBODIMENT

Figure 1:
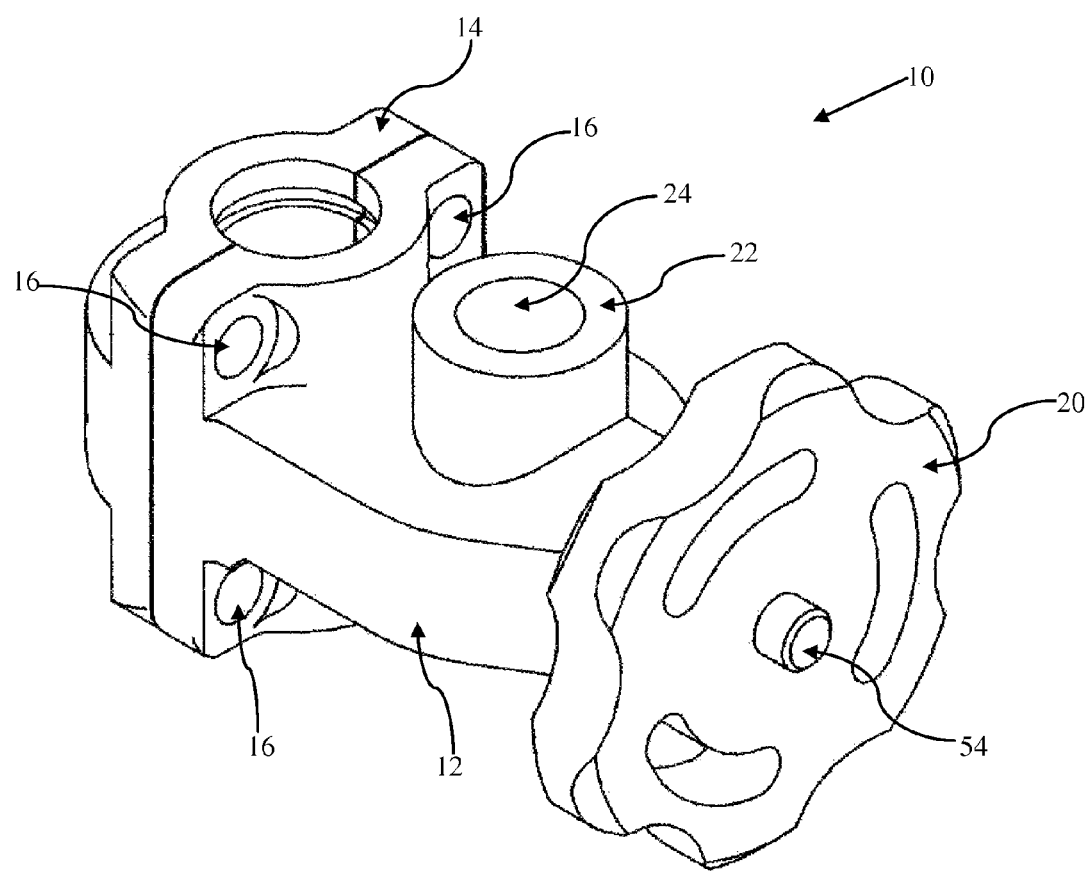
FIG. 1 shows a schematic perspective view of a shear valve.
Figure 3:
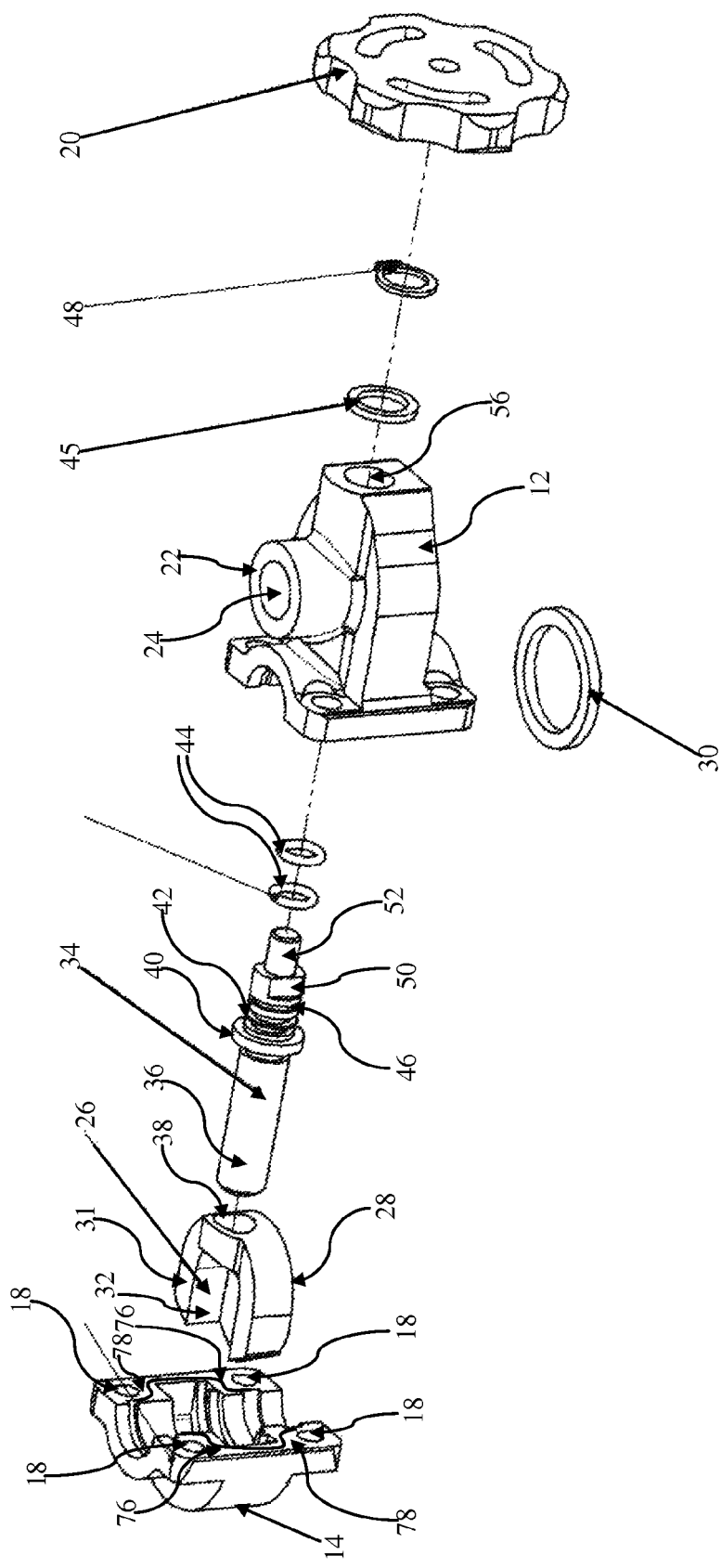
FIG. 3 shows schematic perspective exploded view of the shear valve of FIG. 1.

Referring firstly to FIG. 1, a shear valve is indicated generally at 10. The shear valve 10 includes a first part 12 for placing on one side of a pipe and a second part 14 for placing on the other side of the pipe, the first and second parts being held together in use on the pipe by threaded screws. The screws pass through apertures 16 in the first part and are received in female threaded apertures 18 of the second part 14, as shown in FIG. 3. The first and second parts 12, 14 are ideally produced by casting. A handle 20 is provided for actuation of the shear valve 10 and is mounted on the first part 12. A boss 22, having a central aperture 24 in communication with a chamber inside the shear valve 10, is disposed on one side of the first part 12. The purpose of the boss 22 is to provide an outlet for the splitting of a flow of fluid through a pipe engaged by the shear valve, as will be explained further below.

Figure 2:
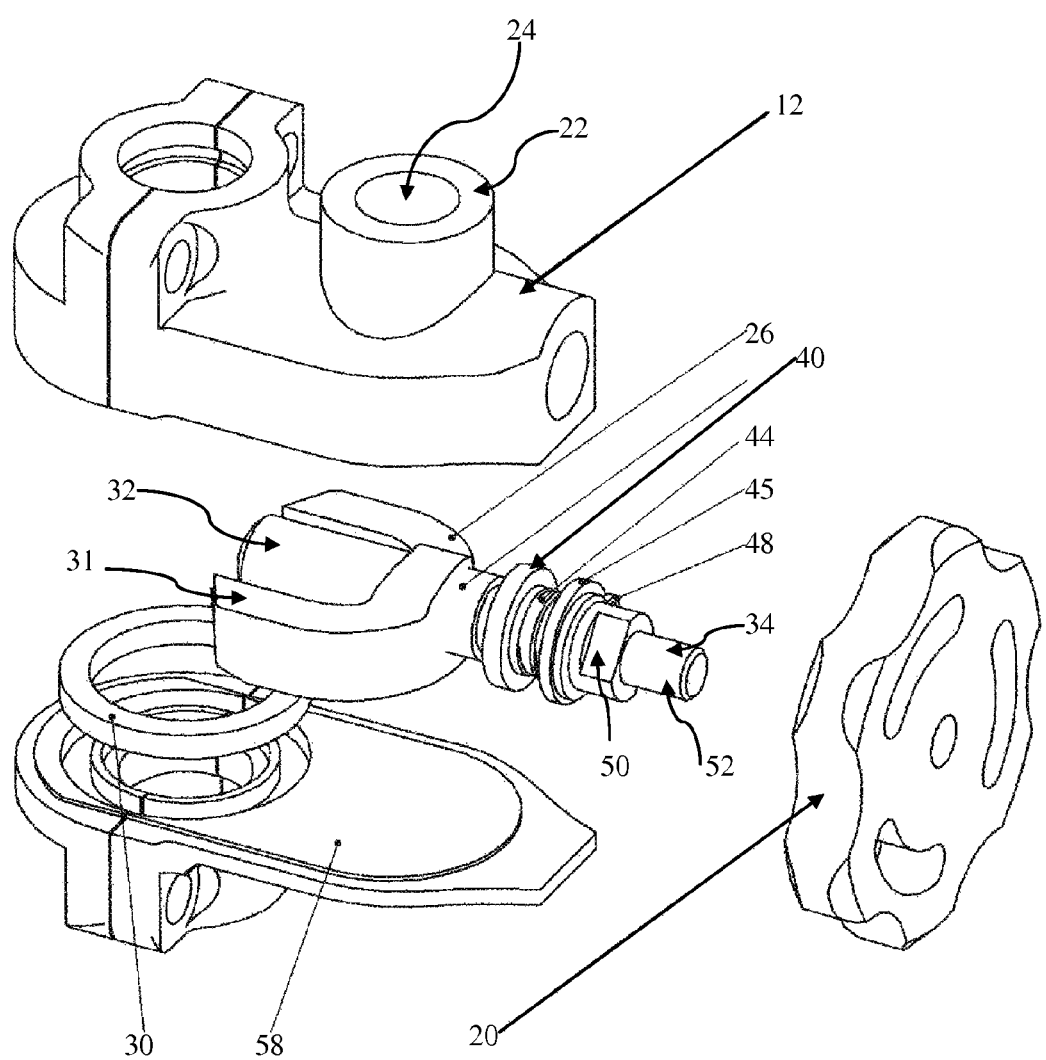
FIG. 2 shows a schematic perspective exploded view of the shear valve of FIG. 1, the shear valve being split longitudinally for illustration purposes only.
Figure 5:
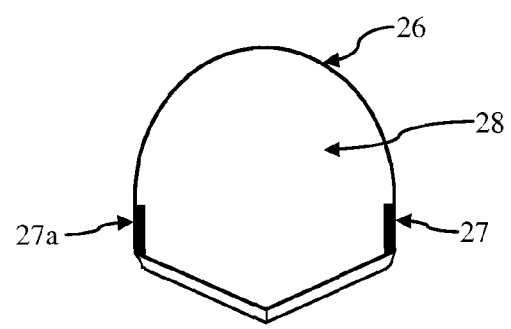
FIG. 5 shows a schematic rear view of the blade.

Referring to FIGS. 2 and 3, a blade 26 is mounted within the first part 12 for actuation across a pipe retained in between the first and second parts 12, 14 for cutting or shearing the pipe. The blade 26 is substantially flat on one side, indicated at 28, for sealing against an O-ring 30. The sides and rear of the blade 26 are formed in a C-shape and the tip of the blade is pointed. Referring also to FIG. 5, which shows the back or substantially flat side 28 of the blade 26, a narrow elongate protrusion 27, 27a is provided on each side of the blade. Each protrusion 27, 27a extends part way along each side of the blade 26. Each protrusion 27, 27a is around 2 mm in width, and is around 0.5 mm deep, although the sizes are dependent on the overall size of the blade 26 and valve 10. The protrusions 27, 27a run in parallel and are parallel with the cutting axis of the blade. The blade 26 is symmetrical about a central axis, with a pointed tip of the blade being on the central axis. A substantially C-shaped flange 31 extends around the sides and rear of the blade 26 and a space 32 is defined between the internal surfaces of the flange 31 for supporting a pipe during the cutting process. A drive member 34 is externally threaded at its lower end 36 and engages in a threaded bore 38 passing through the top of the flange 31.

In use, the threaded end of the drive member 34 may pass through the threaded bore 38 and into the space 32 between the flange surfaces 30. A circumferential flange 40 is disposed around the drive member 34 at the top end of the threaded portion 36. On the top side of the drive member 34, beyond the circumferential flange 40 are provided several circumferential recesses 42 for receiving washers 44. A further circumferential recess 46 is provided for receiving a circlip 48. The end of the drive member 34 is provided with a pair of flats 50 for engagement with a correspondingly shaped aperture in the underside of the handle 20 and a threaded portion of reduced diameter 52 extends from the flats. A nut 54, shown in FIG. 1, is screwed onto the threaded region 52 for holding the handle 20 in position. An aperture 56 is provided in the end of the first part 12, through which the end of the drive member 34 can pass.

In the assembled shear valve, the washers 44 sit in the recesses 42 and the upper end of the drive member 34 passes through the aperture 56 in the first part 12. The aperture 56 is sized so that the washers 44 are compressed and form a seal. The flange 40 bears against the inside of the first part 12 against the periphery of the aperture 56. The circlip 48 then locks into the recess 46 of the drive member 34 and bears against a washer 45 on the top of the first part 12. The flange 40, washer 45 and circlip 48 serve to hold the drive member 34 in its longitudinal position. The handle 20 then fits onto the flats 50 of the drive member 34 and is fastened in position by tightening the nut onto the end of the threaded portion 52 of the drive member, which passes through the handle 20. The threaded bore 38 of the blade 26 is screwed onto the threaded lower end 36 of the drive member. One or more of the washers may be made from Teflon®, or be Teflon® coated, in order to reduce friction on movement of the drive member 34.

Figure 4:
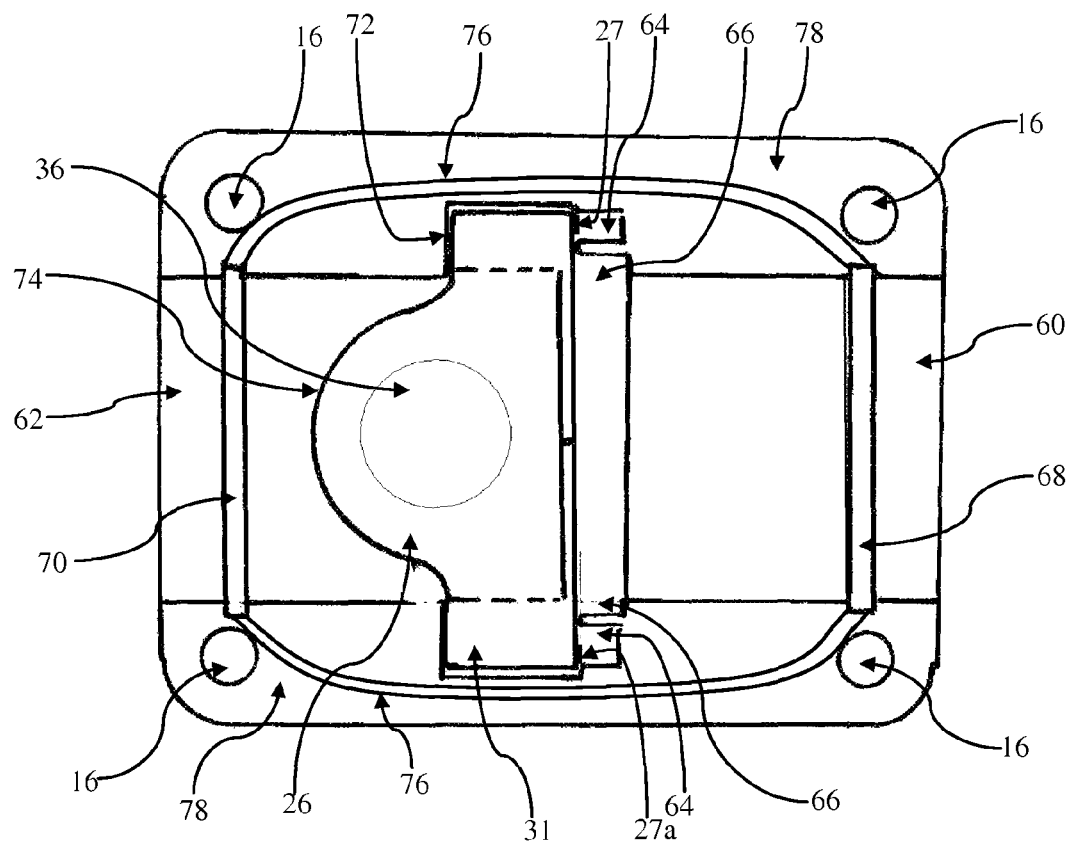
FIG. 4 shows a schematic end view of the assembled blade and first part of the shear valve of FIG. 1.

Referring also to FIGS. 2 and 4, the first part 12 has an internal chamber, in which the blade moves and the threaded end of the drive member 34 and blade 26 are accommodated. The chamber is substantially flat on one side thereof, indicated at 58. The flat side 28 of the blade 26 bears against and slides over the flat surface of the inside of the chamber. Where the first and second parts 12, 14 join together, they define circular apertures 60, 62, connecting to the central chamber of the valve. A circular slot 64 or recess is provided co-axially around the aperture 60 in the internal face 58 for receiving the O-ring 30. Although the O-ring is shown as a single piece in the Figures, it will be appreciated that the O-ring is split to coincide with the split between the first and second parts 12, 14. A circumferential recess or counter-bore 66 is also provided around the periphery of the aperture 60, which is open to the central chamber for purposes explained below. Circumferential counter-bores or recesses 68, 70 are also provided internally of the apertures 60, 62, best seen on FIG. 4. The recesses 68, 70 are equi-spaced between the internal chamber and the outer edge of the valve casing and lie substantially aligned with the screw apertures 16, 18.

The edge 72 of the C-shaped flange 31 of the blade 26 falls within a plane along the sides of the blade, but is curved outwardly at 74, at the position of the threaded bore 38. The protrusions 27, 27a lie flush with the edge 72 of the C-shaped flange 31. The edge 72 bears against parallel surfaces on the inside of the first part 12 and the curved portion 74 is received in a correspondingly shaped recess in the internal wall of the first part 12. The aperture 24 in the side wall of the first part communicates with recess for receiving the curved portion 74 of the blade flange 31.

As seen in FIG. 4, a pair of grooves 76 is provided on an inner surface of the first part 12, each groove 76 being positioned on each area of contact 78 with the second part 14. The second part 14 is also provided with a corresponding pair of grooves so that when the screws are tightened to hold parts 12, 14 together, each groove on the second part 14 is substantially aligned with each groove 76 on the first part 12. Silicon sealant can be applied onto the grooves 76 before the two parts 12, 14 are screwed together so that when tightened the silicon fills the grooves, thereby forming a seal between the parts and extending between the split seals or silicon band sealant in the recesses 68, 70.

In use, the handle 20 is turned, for example, anti-clockwise, to withdraw the blade 26 into the first part 12. As the drive member 34 rotates, it maintains its longitudinal position in the first part and the blade 26 is drawn up the screw thread 36, because the blade is held against rotation. The split seals or a silicon based sealant are placed in the recesses 68,70, the split O-ring seal placed in the recess 64, the first and second parts 12, 14 placed on either side of a pipe. Screws are inserted through the holes 16, 18 and tightened to hold the parts 12, 14 together.

The blade 26 can then be actuated across the pipe by rotation, for example, clockwise rotation, of the handle 20. The blade moves down the screw thread 36 of the drive member and the point of the blade initially pierces the pipe. The blade then continues across the pipe and shears it into two. During shearing, the protrusions 27, 27a on the blade 26 bear against and move down adjacent the slot 64, in which the split O-ring 30 is received. The protrusions 27, 27a maintain the blade 26 perpendicular to the pipe and parallel to the face of the O-ring 30. This results in a reduction of frictional forces between the pipe and the blade 26, further ensuring that the blade 26 cuts the pipe cleanly.

Friction of the cutting action is relieved by virtue of the counter-bore 66, because the pipe can expand into the counter-bore 66. Further relief is provided because the pipe can also expand into the recesses 68, 70. Also, the lower edge of the pipe tends to curl downwardly, ie in the direction of the blade movement as it cuts, and this curl is accommodated in the counter-bore 66. The swelling of the pipe into the recesses 68, 70 and the curl of the pipe end into the counter-bore 66 effectively hold the ends of the pipe firmly in the valve 10. Also, as the blade moves downwardly, the sides of the pipe are supported on the inside of the flange wall 31. Effectively, the opposing side walls of the flange 31 prevent the pipe from spreading. This has the effect of ensuring that the pipe is cut, rather than being compressed and not cut by the blade 26.

When the blade reaches the end of its downward travel, towards the second part 14, the pipe is completely sheared. Also, the surface 28 of the blade 26 forms a seal against the split O-ring 30, thereby shutting off flow through the pipe and valve. The protrusions 27, 27a on the blade surface 28 set the contact between the blade 26 and the O-ring 30 and prevents the blade 26 from over-compressing or otherwise damaging the O-ring 30 and breaking the seal. Opening the valve, by withdrawing the blade 26 allows flow to pass along the pipe, but also up though the centre of the blade between the flange walls 31 through the aperture 24 in the boss 22. This can be connected, for example, to a further pipe. The flow is thereby effectively split and around 40% to 50% of the flow is directed through the aperture 24, if the flow is substantially unrestricted. The blade can be actuated back and forth as necessary, between the open and closed positions for controlling flow through the pipe. It can also be partially opened for allowing partial flow.

In an alternative embodiment, the boss 22 and aperture 24 are not present. In other words, the shear valve acts simply as a shut off valve after the shearing of a pipe is completed.

The shear valve 10 can be made to fit different sizes of pipe, e.g. 15 mm, 22 mm diameter and will cut both plastics and copper pipe with ease. The positioning of the counter-bore ensures that a live pipe is retained in the valve, and flow can easily be split from a live pipe.

It is understood that variations may be made in the foregoing without departing from the scope of the invention. For example, the elements and teaching of the various illustrative embodiments may be combined in whole or in part in some or all of the illustrative embodiments within the scope of the claims.

The invention claimed is:

1. A shear valve comprising a casing having a first part for positioning on one side of a pipe and a second part engageable with the first part for positioning on the other side of the pipe, and a blade for shearing the pipe disposed substantially within the first part and actuable across the pipe towards the second part for cutting the pipe, the blade having a cutting region and a support region for supporting the periphery of the pipe and substantially preventing the pipe from collapsing, as the pipe is being cut.

2. A shear valve as claimed in claim 1, in which the blade has a pair of support surfaces extending substantially perpendicularly from one side of the blade, in use, the support surfaces passing on opposite sides of a pipe being cut by the shear valve.

3. A shear valve as claimed in claim 2, in which the support surfaces are part of a substantially C-shaped flange, provided around the sides and non-cutting end of the blade.

4. A shear valve as claimed in claim 1, in which the blade is guided on guide surfaces within the first part as it is actuated.

5. A shear valve as claimed in claim 1, in which the first and second parts, when assembled, have a straight bore therethrough for receiving a pipe.

6. A shear valve as claimed in claim 5, in which the bore opens into a central chamber of the shear valve.

7. A shear valve as claimed in claim 6, in which a counter-bore is provided at the junction of the bore with the central chamber.

8. A shear valve as claimed in claim 7, in which the counter-bore faces a substantially flat surface of the blade.

9. A shear valve as claimed in claim 8, in which a second and a third counter-bore are provided in the bore proximate the respective ends of the bore, for receiving seals for sealing the bore to a pipe passing through the bore on either side of the shear valve.

10. A shear valve as claimed in claim 9, in which the first part is connected to the second part by screws.

11. A shear valve as claimed in claim 10, in which the screws are threaded into the threaded bores in the second part and extend through apertures in the first part.

12. A shear valve as claimed in claim 10, in which the second and third counter-bores are positioned substantially at or between the positions of the screws.

13. A shear valve as claimed in claim 1, in which an aperture is provided in the casing for splitting of the flow through the valve.

14. A shear valve as claimed in claim 13, in which the aperture is provided in the first part.

15. A shear valve as claimed in claim 13, in which an external boss is provided around the aperture, for connection with a pipe or hose.

16. A shear valve as claimed in claim 1, in combination with a pipe which is sized to be supported by the support region of the blade of the shear valve.

17. A shear valve comprising a casing having a first part for positioning on one side of a pipe and a second part engageable with the first part for positioning on the other side of the pipe, and a blade for shearing the pipe disposed substantially within the first part and actuable across the pipe towards the second part for cutting the pipe, the blade having a cutting region and the blade further including a pipe support in the form of a flange, opposing inside walls of the flange supporting the pipe as it is cut, preventing the pipe from spreading.

18. A shear valve as claimed in claim 17, in combination with a pipe, the pipe having an outside diameter which is similar to the distance between the opposing inside walls of the flange.

19. A shear valve and a pipe, the shear valve comprising a casing having a first part for positioning on one side of the pipe and a second part engageable with the first part for positioning on the other side of the pipe, and a blade for shearing the pipe disposed substantially within the first part and actuable across the pipe towards the second part for cutting the pipe, the blade having a cutting region and the blade further including a pipe support in the form of a flange, the pipe having an outer diameter which is similar to an inside diameter of the flange, so that inside walls of the flange bear against sides of the pipe as it is being cut, substantially preventing the pipe from collapsing or spreading.

20. A shear valve and a pipe as claimed in claim 19, in which the first part of the casing is positioned on one side of the pipe and the second part of the casing is engaged with the first part and positioned on the other side of the pipe, the pipe having been cut by the blade without being compressed.

* * * * *